United States Patent
Hedinsson (10) Patent No.: US 11,750,867 B2
(45) Date of Patent: Sep. 5, 2023

(54) SYSTEMS AND METHODS FOR DETERMINING AND DISTRIBUTING FEES ASSOCIATED WITH CURATED VIDEO CLIPS

(71) Applicant: Disney Enterprises, Inc., Burbank, CA (US)

(72) Inventor: Skarphedinn Hedinsson, Encino, CA (US)

(73) Assignee: Disney Enterprises, Inc., Burbank, CA (US)

(*) Notice: Subject to any disclaimer, the term of this patent is extended or adjusted under 35 U.S.C. 154(b) by 393 days.

(21) Appl. No.: 15/072,018

(22) Filed: Mar. 16, 2016

(65) Prior Publication Data
US 2017/0272796 A1  Sep. 21, 2017

(51) Int. Cl.
| | |
|---|---|
| H04N 21/2543 | (2011.01) |
| H04N 21/84 | (2011.01) |
| H04N 21/262 | (2011.01) |
| H04N 21/24 | (2011.01) |
| H04L 65/612 | (2022.01) |
| H04N 21/81 | (2011.01) |

(52) U.S. Cl.
CPC ....... H04N 21/2543 (2013.01); H04L 65/612 (2022.05); H04N 21/2407 (2013.01); H04N 21/26258 (2013.01); H04N 21/84 (2013.01); H04N 21/812 (2013.01)

(58) Field of Classification Search
CPC ........... H04N 21/4788; H04N 21/2668; H04N 21/4756; H04N 21/4825; H04N 21/26258; H04N 21/4784; H04N 21/25891; H04N 21/439; G06F 3/0482; G06F 17/30775; G06Q 50/01
See application file for complete search history.

(56) References Cited

U.S. PATENT DOCUMENTS

| | | | |
|---|---|---|---|
| 10,032,145 B1* | 7/2018 | Zack | G06Q 20/102 |
| 2003/0115144 A1* | 6/2003 | Stefik | G06F 21/10 |
| | | | 705/51 |

(Continued)

OTHER PUBLICATIONS

Nolo, Who Owns and Holds the Rights to a Copyright, Dec. 11, 2015, https://web.archive.org/web/20151211174053/https://www.nolo.com/legal-encyclopedia/copyright-ownership-rights-29953.html (Year: 2015).*

*Primary Examiner* — Jason Salce
(74) *Attorney, Agent, or Firm* — Farjami & Farjami LLP (57) ABSTRACT

There is provided a system including a memory storing an executable code and a processor executing the executable code to provide access to a plurality of users to curate video clips stored in a content repository, wherein each video clip is associated with one of a plurality of ownership identifications, receive curation inputs from a user of one of a plurality of user devices arranging two or more video clips into a video compilation, wherein a first video clip is associated with the first ownership identification of a first content owner and a second video clip is associated with the second ownership identification of a second content owner, stream the video compilation to one or more of the plurality of user devices, and distribute a first fee to the first content owner and a second fee to the second content owner, in response to streaming the video compilation.

23 Claims, 6 Drawing Sheets

(56) References Cited

U.S. PATENT DOCUMENTS

| | | | | |
|---|---|---|---|---|
| 2004/0230994 A1* | 11/2004 | Urdang | ............... | H04N 7/17318 725/88 |
| 2005/0086119 A1* | 4/2005 | Komuro | ................. | G06Q 30/02 705/26.1 |
| 2007/0067482 A1* | 3/2007 | Johnson | ............. | G06F 17/30017 709/231 |
| 2007/0250901 A1* | 10/2007 | McIntire | ............ | H04N 7/17318 725/146 |
| 2008/0092182 A1* | 4/2008 | Conant | .............. | H04N 7/17318 725/109 |
| 2008/0208692 A1* | 8/2008 | Garaventi | ............ | G06Q 20/102 705/14.69 |
| 2009/0178003 A1* | 7/2009 | Fiedler | ................. | G06Q 20/102 715/810 |
| 2009/0327100 A1* | 12/2009 | Greenberg | ............ | G06F 3/0481 705/26.1 |
| 2010/0063873 A1* | 3/2010 | McGucken | ............ | G06Q 30/02 705/14.4 |
| 2010/0185502 A1* | 7/2010 | Roberts | ................. | G06Q 30/02 705/14.7 |
| 2011/0066506 A1* | 3/2011 | Sung | ....................... | G06Q 30/02 705/14.66 |
| 2011/0185378 A1* | 7/2011 | Johnson | ............. | H04N 5/44543 725/25 |
| 2012/0023131 A1* | 1/2012 | Downey | ........... | G06F 17/30038 707/769 |
| 2013/0166478 A1* | 6/2013 | Sugii | ....................... | G06Q 30/00 705/400 |
| 2016/0241922 A1* | 8/2016 | Carpenter | ........... | H04N 21/4825 |
| 2016/0366459 A1* | 12/2016 | Kochman | ........... | H04N 21/2743 |

\* cited by examiner

SYSTEMS AND METHODS FOR DETERMINING AND DISTRIBUTING FEES ASSOCIATED WITH CURATED VIDEO CLIPS

BACKGROUND

Posting a video compilation on the Internet requires compiling existing video clips to create the video compilation, and uploading the video compilation to a video hosting website, such as a video-sharing website or a social media website. However, conventional methods of creating and posting video compilations may not provide an appropriate distribution of advertising revenue earned when the video compilation is viewed.

SUMMARY

The present disclosure is directed to systems and methods for determining and distributing fees associated with curated video clips, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
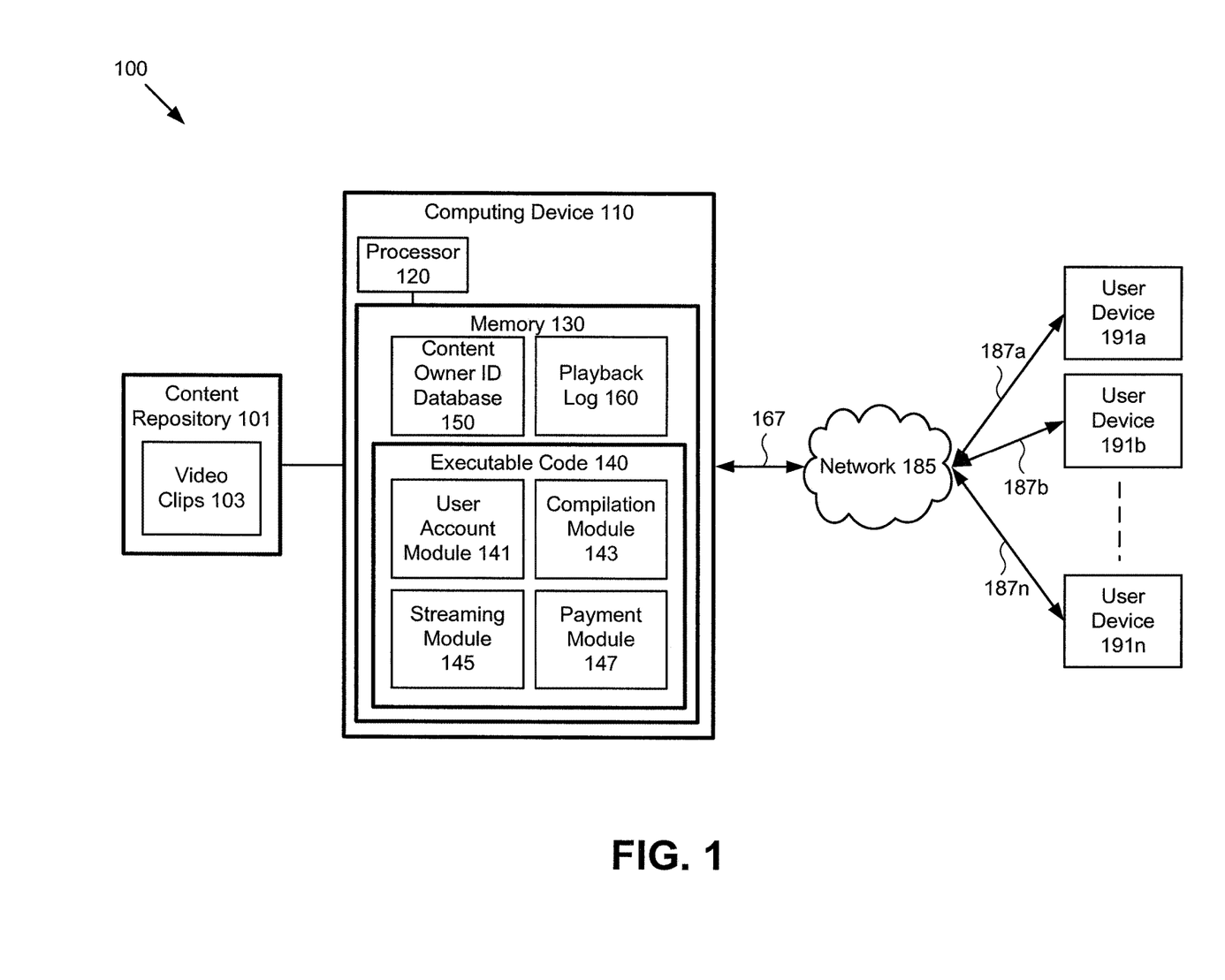
FIG. 1 shows a diagram of an exemplary system for determining and distributing fees associated with curated video clips, according to one implementation of the present disclosure.

FIG. 1 shows a diagram of an exemplary system for determining and distributing fees associated with curated video clips, according to one implementation of the present disclosure. System 100 includes content repository 101, computing device 110, network 185, and a plurality of user devices 191a, 191b, . . . , 191n. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes executable code 140, content owner identification (ID) database 150, and playback log 160. In some implementations, computing device 110 may be a server operated by a content provider, or computing device 110 may be a third party server.

Content repository 101 may include a plurality of media contents, such as video clips 103, and may be stored on a media server. In some implementations, content repository 101 may be stored on a media server operated by a content provider, a media server operated by a third party, on a plurality of media servers, in memory 130, etc. As shown in FIG. 1, content repository 101 includes video clips 103. Video clips 103 may include one or more video recordings for creating a video compilation. Video clips 103 may include a plurality of video clips associated with one or more content owners. The contents of video clips 103 may include home videos, a portion of network television content such as a sitcom, a portion of a professional sporting event, a portion of a concert, a portion of a music video, etc. In some implementations, each video clip of video clips 103 may include a content owner ID. The content owner ID may be included as a watermark, an audio watermark, metadata, etc.

Executable code 140 includes one or more software modules stored in memory 130 for execution by processor 120 of computing device 110. As shown in FIG. 1, executable code 140 includes user account module 141, video compilation module 143, streaming module 145, and payment module 147. User account module 141 is a software module for execution by processor 120 to create user accounts to enable a user to playback log in and create a video compilation. In some implementations, user account module 141 may allow a user to create a user account having a username and password used for secure playback login, and may allow the user to create one or more video compilations associated with the user account. Once a user has created a user account, the user may playback login from any computer, such as one of user devices 191a, 191b, . . . , 191n and create a new video compilation, and/or modify an existing video compilation associated with the user account.

Video compilation module 143 is a software module for execution by processor 120 to receive curation inputs from a user of one user devices 191a, 191b, . . . , 191n creating a video compilation. In some implementations, video compilation module 143 may receive curation inputs to arrange one or more of video clips 103 to be streamed as a compilation. As shown in FIG. 1, executable code 140 also includes streaming module 145. Streaming module 145 is a software module for execution by processor 120 to stream video clips 103 and video compilations to user devices 191a, 191b, 191n. In some implementations, streaming module 145 may stream video clips 103 and/or video compilations over network 185.

Payment module 147 is a software module for execution by processor 120 to distribute payments to one or more video content owners. In some implementations, payment module 147 may compare an ownership identification (ID) associated with one or more of video clips 103 with content owner ID database 150 to determine the content owner of each video clip 103 in a video compilation. Payment module 147 may distribute fees based on the video clips that are streamed over network 185. Content owner ID database 150 is a database including a plurality of ownership IDs. In some implementations, each ownership ID may be associate with one or more of video clips 103.

Playback log 160 is a database that includes a record of how many times a video clip of video clips 103 and/or a video compilation is streamed. In some implementations, playback log 160 may include a record of the number of times a video compilation begins streaming, completes streaming, is partially streamed, etc. Playback log 160 may also include the number of times each video clip of video clips 103 begins streaming, completes streaming, is partially streamed, etc. In some implementations, playback log 160 may be used to determine a fee amount to be distributed to a content owner.

Network 185 may be a computer network, such as the Internet. Computing device 110 may be connected to network 185 via connection 167, and media devices 191*a*, 191*b*, . . . , 191*n* may be connected to network 185 via corresponding connections 187*a*-187*n*. User devices 191*a*, 191*b*, . . . , 191*n* may be devices capable of creating, editing, and/or viewing media channels. In some implementations, user devices 191*a*, 191*b*, . . . , 191*n* may include a television, a computer, a tablet computer, a mobile phone, etc. Each user device 191*a*, 191*b*, . . . , 191*n* may display a main video feed including a media channel, e.g., the highest ranking media channel, a media channel selected by the user, etc. In other implementations, each user device 191*a*, 191*b*, . . . , 191*n* may display a streaming media channel and one or more video feeds from video inputs 101*a*, 101*b*, . . . , 101*m*.

Figure 2:
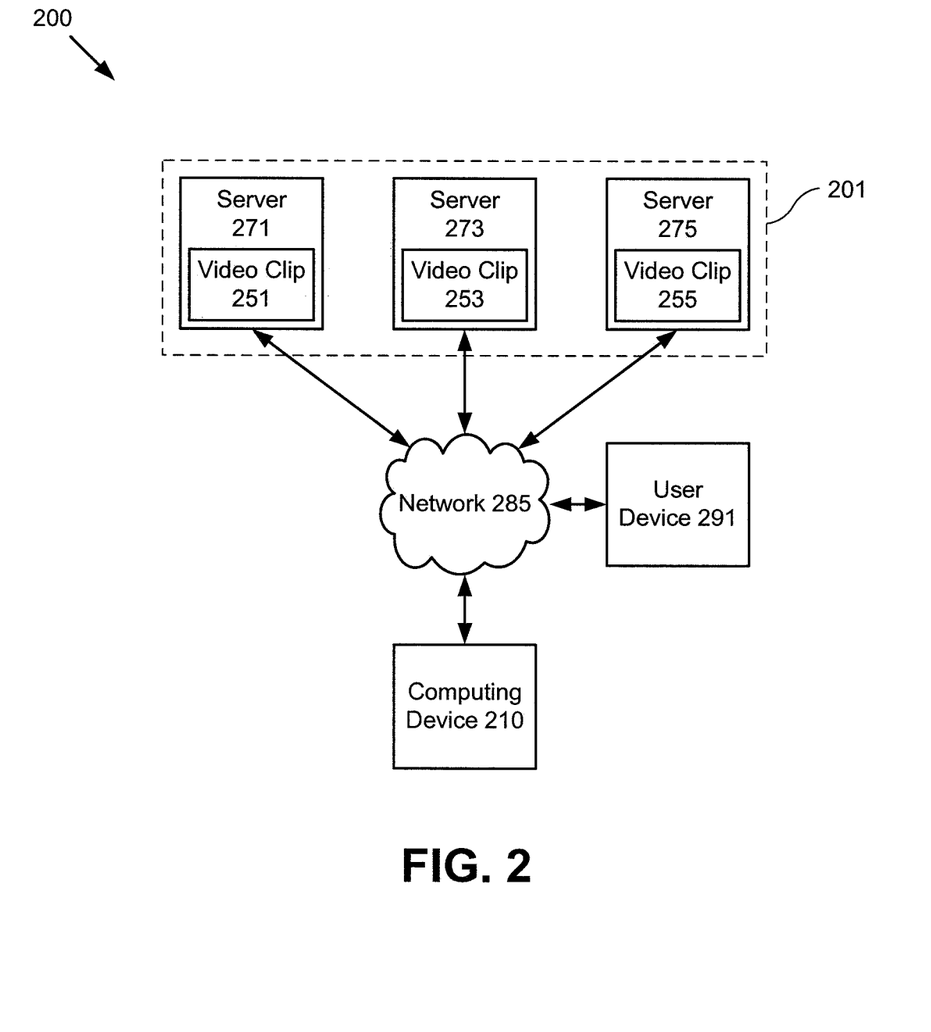
FIG. 2 shows a diagram of another exemplary system for determining and distributing fees associated with curated video clips, according to one implementation of the present disclosure.

FIG. 2 shows a diagram of another exemplary system for determining and distributing fees associated with curated video clips, according to one implementation of the present disclosure. Diagram 200 includes content repository 201, computing device 210, network 285, and user device 291. As shown in FIG. 2, content repository 201 includes server 271, server 273, and server 275. Servers 271, 273, 275 include corresponding video clips, video clip 251, video clip 253, and video clip 255. In some implementations, different content owners may operate servers 271, 273, 275. For example, server 271 may be operated by a broadcast television network, server 273 may be operated by a professional sports league, and server 275 may be operated by a record label. Each content owner may have a corresponding content owner ID that may be included in each video clip of content repository 201. In other implementations, servers 271,273, 275 may be operated by the same content owner and/or servers 271, 273, 275 may be the same server.

To create a video compilation, computing device 210 may provide user device 291 with access to content repository 201 via network 285. In some implementations, a user of user device 291 may create a video compilation including a part of video clip 251, a part of video clip 253, and a part of video clip 255. Creating the video compilation may include downloading the included parts of each video clip 251, 253, 255 and saving the video compilation on computing device 210, and computing device 210 may stream the video compilation to user device 291 via network 285. In other implementations, creating the video compilation may include locating the included parts of each video clip 251, 253, 255 and creating a playlist or manifest file including a location for each included video clip 251, 253, 255, such as a URL for the included portion of each video clip 251, 253, 255. Computing device 210 may stream to user device 291 using the video compilation using the playlist or manifest file.

Figure 3:
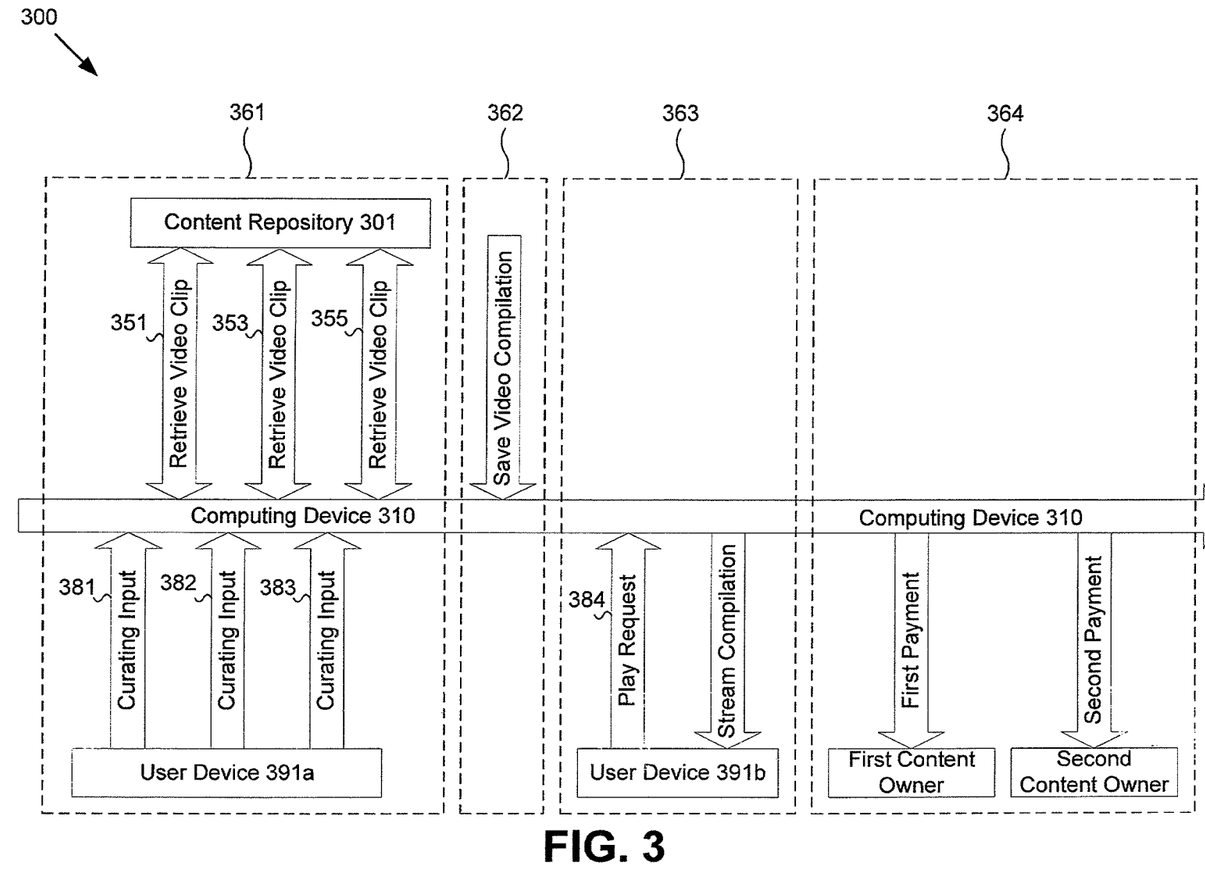
FIG. 3 shows an exemplary flow diagram of communications for determining and distributing fees associated with curated video clips using the system of FIG. 1, according to one implementation of the present disclosure.

FIG. 3 shows an exemplary flow diagram of communications for determining and distributing fees associated with curated video clips using the system of FIG. 1, according to one implementation of the present disclosure. Flow diagram 300 begins with box 361, which depicts computing device 310 providing user device 391*a* with access to content repository 301, and computing device 310 retrieving video clips 351, 353, 355 to create a video compilation. User device 391*a* sends curating input 381 to computing device 310. In response to curating input 381, computing device 310 retrieves video clip 351 from content repository 301. Next, user device 391*a* sends curating input 382 to computing device 310. In response to curating input 382, computing device 310 retrieves video clip 353 from content repository 301. Finally, user device 391*a* sends curating input 383 to computing device 310. In response to curating input 383, computing device 310 retrieves video clip 355 from content repository 301.

At 362, computing device 310 saves the video compilation. In some implementations, computing device 310 may save the video compilation in a local memory, or computing device 310 may save the video compilation on a media server (not shown) for streaming video compilations. Method 300 continues at 363, where user device 391*b* sends play request 384 for playback of the video compilation to computing device 310. In response to receiving play request 384 for playback of the video compilation, computing device 310 streams the video compilation to user device 391*b*.

At 364, computing device 310 distributes a first payment to a first content owner and a second payment to a second content owner based on one or more content owner IDs included in the video compilation. In some implementations, more than one of the video clips included in the video compilation may be associated with the same content owner ID. For example, the first video clip and the second video clip may be associated with the first content owner ID, or the first video clip and the third video clip may be associated with the second content owner ID, etc. In some implementations, one or more of video clips 351, 353, 355 may include an audio component, such as a soundtrack including music. The audio component may include audio that may be associated with a content owner ID that is different from the content owner ID associated with the corresponding video clip.

Figure 4:
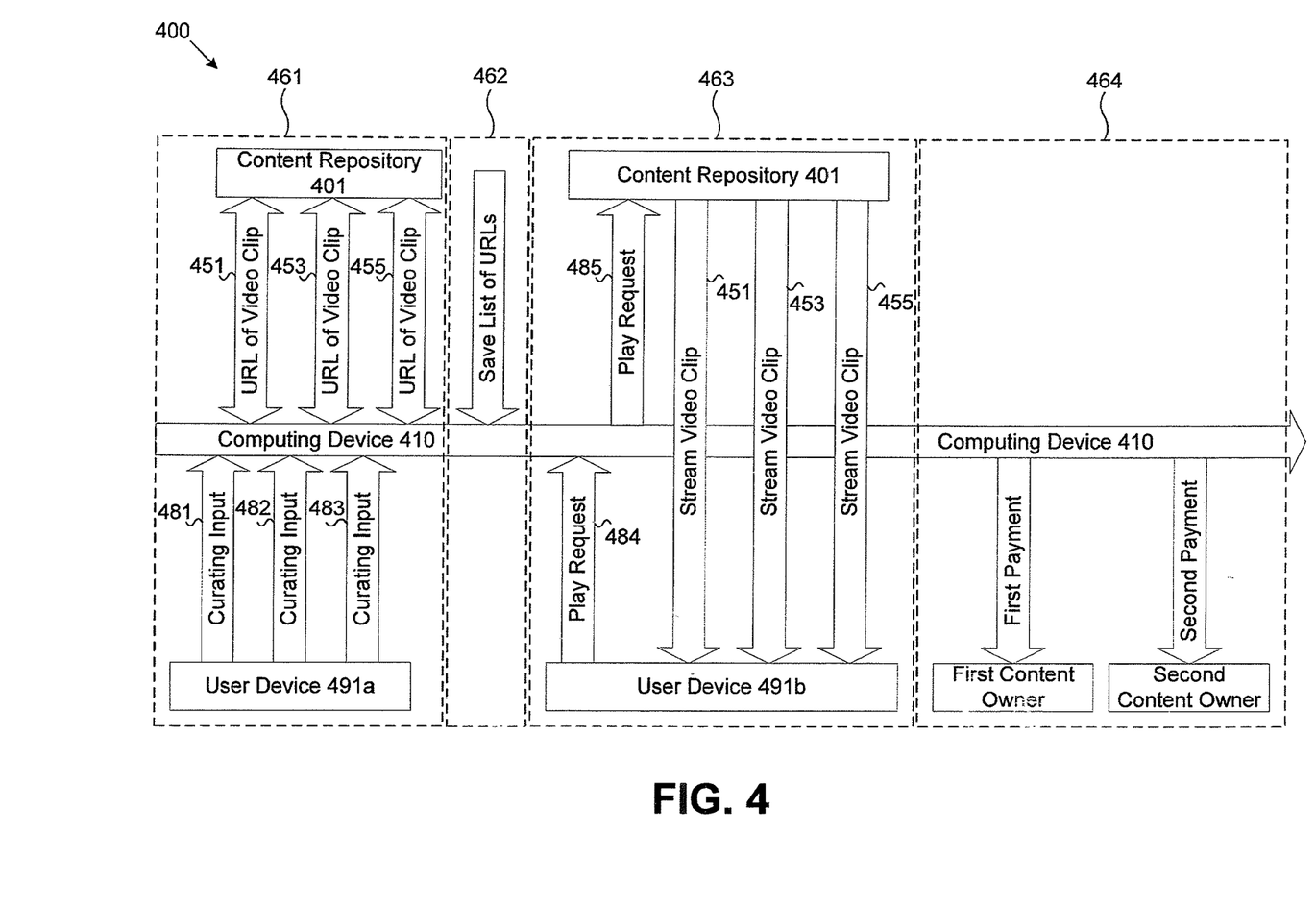
FIG. 4 shows another exemplary flow diagram of communications for determining and distributing fees associated with curated video clips using the system of FIGS. 1 and 2, according to one implementation of the present disclosure.

FIG. 4 shows another exemplary flow diagram of communications for determining and distributing fees associated with curated video clips using the system of FIGS. 1 and 2, according to one implementation of the present disclosure. Diagram 400 begins with box 461, which depicts computing device 410 providing user device 491*a* with access to content repository 401, and computing device 410 retrieving video clips 451, 453, 455 to create a video compilation. User device 491*a* sends curating input 481 to computing device 410. In response to curating input 481, computing device 410 retrieves a URL locating video clip 451 in content repository 401. Next, user device 491*a* sends curating input 482 to computing device 410. In response to curating input 482, computing device 410 retrieves a URL locating video clip 453 in content repository 401. Finally, user device 491*a* sends curating input 483 to computing device 410. In response to curating input 483, computing device 410 retrieves a URL locating video clip 455 in content repository 401.

At 462, computing device 410 saves a list including the URLs locating video clips 451, 453, 455 in content repository 401. In some implementations, computing device 410 may save the video compilation in a local memory, or computing device 410 may save the video compilation on a media server (not shown) for streaming video compilations. Diagram 400 continues at 463, where user device 491*b* sends play request 484 for playback of the video compilation to computing device 410. In response to receiving the request for playback of the video compilation, computing device 410 sends play request 485 including the URLs of video clips 451, 453, 455 to content repository 401 and streams the video compilation from content repository 401 to user device 491*b*.

At 464, computing device 410 determines and distributes a first payment to a first content owner and a second payment to a second content owner based on one or more content owner IDs included in the video compilation. In some implementations, more than one of the video clips included in the video compilation may be associated with the same content owner ID. For example, the first video clip and the second video clip may be associated with the first content owner ID, or the first video clip and the third video clip may be associated with the second content owner ID, etc. In some implementations, one or more of video clips 451, 453, 455 may include an audio component, such as a soundtrack including music. The audio component may include audio that may be associated with a content owner ID that is different from the content owner ID associated with the corresponding video clip.

Figure 5:
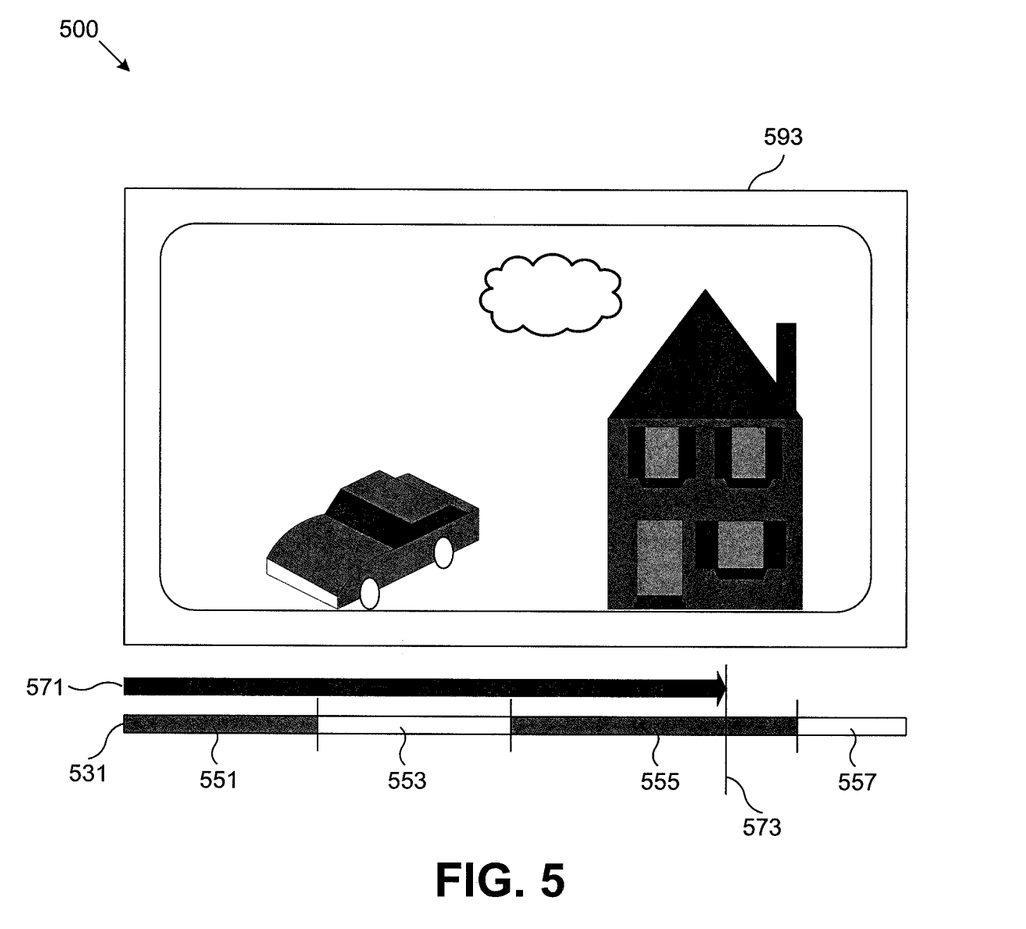
FIG. 5 illustrate a diagram of an exemplary display showing a division of fees associated with curated video clips, according to one implementation of the present disclosure.

FIG. 5 illustrates a diagram of an exemplary display showing a division of fees associated with curated video clips, according to one implementation of the present disclosure. Diagram 500 shows display 593 displaying video compilation 531, including video clip 551, video clip 553, video clip 555, and video clip 557. In some implementations, a user may not view all of video compilation 531. For example, the user may begin viewing video compilation 531 at the beginning of video clip 551 and continue watching through all of video clip 553 and part of video clip 555, as shown by playback arrow 571. When the user reaches time 573 in the playback of video compilation 531, the user may pause or stop playback, leaving video clip 557 unwatched.

In some implementations, streaming module 145 may record the playback of video clips 551, 553, and 555 in playback log 160. Streaming module 145 may record time 573 in playback log 160 for record keeping or to resume playback from time 573 if the user returns to view the remainder of video compilation 531. If the user does not resume viewing video compilation 531, such that video clip 557 is not streamed, payment module 147 may distribute fees to the content owner IDs associated with video clips 551, 553, and 555 for playback of part or all of video clips 551, 553, and 555, but not distribute a fee for video clip 557, because video clip 557 was not streamed. In some implementations, the fee distributed for video clips that are only partially streamed, such as video clip 555, may be distributed in full, not distributed, or distributed in proportion to the amount of the video clip that was streamed.

Figure 6:
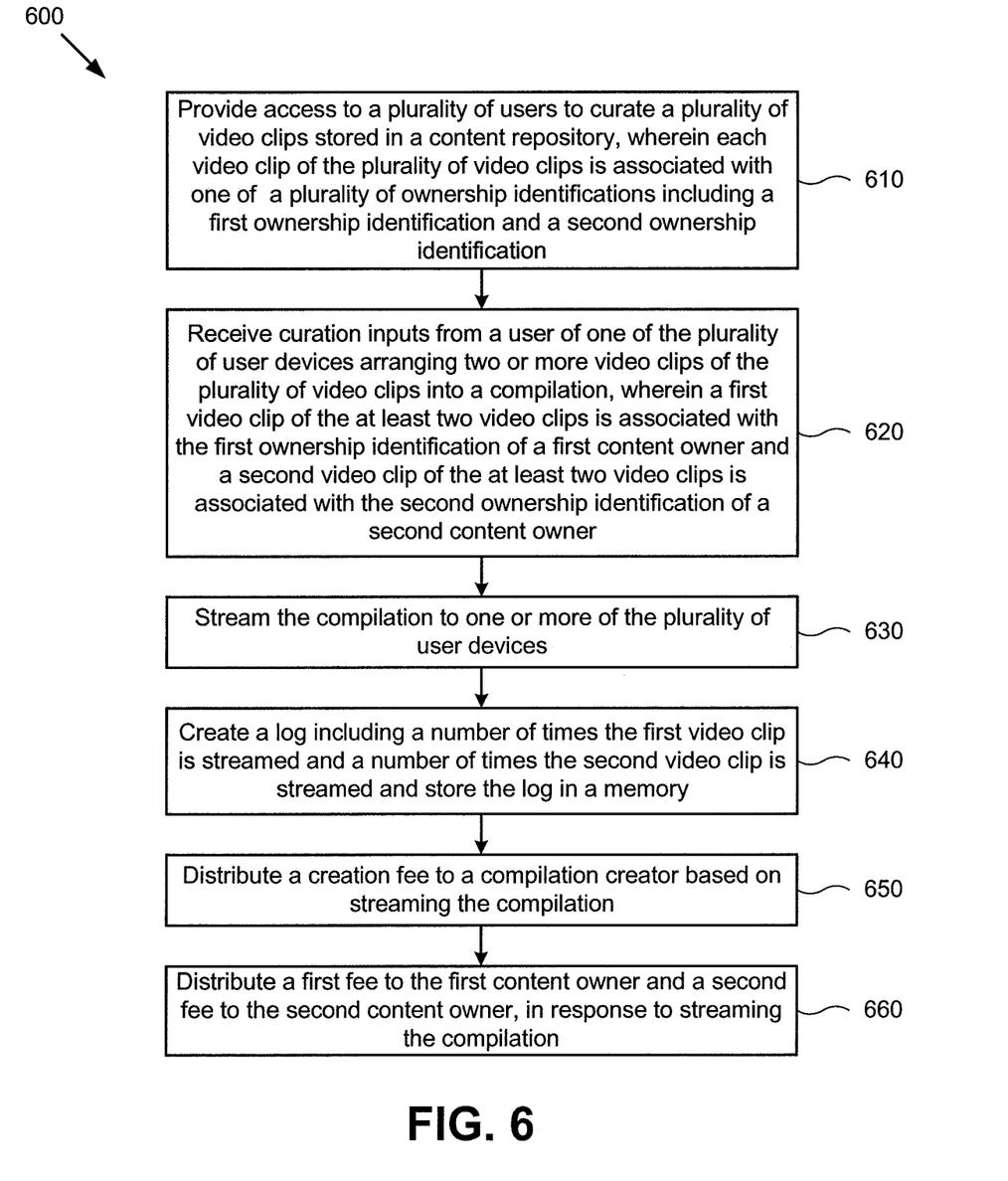
FIG. 6 shows a flowchart illustrating an exemplary method of determining and distributing fees associated with curated video clips, according to one implementation of the present disclosure.

FIG. 6 shows a flowchart illustrating an exemplary method of determining and distributing fees associated with curated video clips, according to one implementation of the present disclosure. Method 600 begins at 610, where executable code 140 provides access to a plurality of users to curate a plurality of video clips stored in a content repository, wherein each video clip of the plurality of video clips is associated with one of a plurality of ownership identifications including a first ownership identification and a second ownership identification. In some implementations, providing access to content repository 101 may include computing device 110 requiring a user to first sign in to a user account. For example, requiring a user account to access content repository 101 may enable executable code 140 to maintain the use of video clips 103 within a walled garden environment.

At 620, executable code 140 receives curation inputs from a user of one of the plurality of user devices arranging two or more video clips of the plurality of video clips into a video compilation, wherein a first video clip of the at least two video clips is associated with the first ownership identification of a first content owner and a second video clip of the at least two video clips is associated with the second ownership identification of a second content owner. The curation inputs may arrange the two or more video clips in an order for playback in the compilation. For example, a user may want to create a compilation for a football player. The user may want to include a first clip form a college football game that is owned by the college and a second clip from a professional football tryout that is owned by the professional football league in the compilation. The user may locate the first clip in content repository 101 and select the first clip to be included in the compilation. The user may then locate the second clip in content repository 101 and select the second clip to be included in the compilation.

At 630, executable code 140 streams the video compilation to one or more of user devices 191*a*, 191*b*, . . . , 191*n*. In some implementations, executable code 140 may use streaming module 147 to stream the video compilation from memory 130. In other implementations, executable code 140 may use streaming module 147 to stream the video compilation from one or more locations on a plurality of media servers. For example, the first clip in the compilation may stream from a media server serving college sports content, and the second clip may stream from the server of the professional football league.

At 640, executable code 140 creates playback log 160 including a number of times the first video clip is streamed and a number of times the second video clip is streamed. In some implementations, executable code 140 may store playback log 160 in memory 130. Playback log 160 may include the number of times the compilation is streamed, either in part or in whole, and/or the number of times each video clip of video clips 103 is streamed, in part or in whole. Playback log 160 may be used to determine fees to be paid to content owners of video clips 103.

At 650, executable code 140 determines and distributes a creation fee to a video compilation creator based on streaming the video compilation. In some implementations, receiving a creation fee may compensate the creator of a video compilation. The creation fee may include a portion of any money received from streaming the compilation, such as a percentage of any advertising revenue earned by streaming the compilation, e.g., 10% of the advertising revenue, 20% of the advertising revenue, 30% of the advertising revenue, etc. The creation fee may be calculated before content owners' fees are calculated, or the creation fee may be calculated after content owners' fees are calculated. Method 600 continues at 660, where executable code 140 distributes a first fee to the first content owner and a second fee to the second content owner, in response to streaming the video compilation. For example, payment module 147 may distribute a first fee to the college that owns the football player's college video clip from the compilation, and a second fee to the professional football league that owns the professional football tryout clip from the compilation. In some implementations, one or more of the plurality of video clips may include an audio component that may be associated with a third ownership identification of a third owner.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing an executable code;
a hardware processor configured to execute the executable code to:
provide access to a user to curate a plurality of video clips stored in a content repository, wherein each video clip of the plurality of video clips is associated with one of a plurality of ownership identifications;
receive curation inputs from the user arranging at least a part of each of two or more video clips of the plurality of video clips into a video clips compilation, wherein the video clips compilation includes a part of a first video clip of the two or more video clips and a part of a second video clip of the two or more video clips, and wherein the first video clip is associated with a first content owner identified by a first ownership identification of the plurality of ownership identifications and the second video clip of the video clips compilation is associated with a second content owner identified by a second ownership identification of the plurality of ownership identifications;
partially and continuously stream the video clips compilation to a user device, wherein the partially and continuously streaming results in providing all of the part of the first video clip and a portion less than all of the part of the second video clip to the user device in a continuous stream; and
in response to partially and continuously streaming the video clips compilation to the user device, calculate a first fee to be distributed to the first content owner based on streaming all of the part of the first video clip to the user device as a first part of the continuous stream, and a second fee to be distributed to the second content owner based on and in proportion of the portion less than all of the part of the second video clip to all of the part of the second video clip, wherein the portion less than all of the part of the second video clip is streamed to the user device as a second part of the continuous stream.

2. The system of claim 1, wherein the content repository includes at least one of a content owner server or a third party server.

3. The system of claim 1, wherein the plurality of ownership identifications include at least one of an ownership identification metadata, a watermark, or an audio watermark.

4. The system of claim 1, wherein the first fee includes a licensing fee based on partially streaming the video clips compilation.

5. The system of claim 1, wherein the hardware processor is further configured to execute the executable code to:
create a playback log including a number of times all of the part of the first video clip is streamed to the user device and a number of times the portion less than all of the part of the second video clip is streamed to the user device; and
store the playback log in the non-transitory memory.

6. The system of claim 5, wherein paying the first fee to the first content owner and the second fee to the second content owner is based on the playback log.

7. The system of claim 1, wherein the video clips compilation includes a plurality of URLs, wherein each URL of the plurality of URLs includes a location of a corresponding video clip in the video clips compilation.

8. The system of claim 1, wherein the video clips compilation includes at least one music clip having a music clip owner, and the hardware processor is further configured to execute the executable code to calculate a third fee to be distributed to the music clip owner based on partially streaming the video clips compilation.

9. The system of claim 1, wherein one of the first video clip or the second video clip includes an audio component associated with a third ownership identification of a third content owner, and the hardware processor is further configured to execute the executable code to calculate a third fee to be distributed to the third content owner based on streaming all or part of the audio component.

10. The system of claim 1, wherein the hardware processor further is further configured to execute the executable code to:
calculate a creation fee to be distributed to a creator of the video clips compilation as a share of an advertising revenue, based on the partially streaming of the video clips compilation, wherein the first fee is calculated from a portion of the advertising revenue.

11. A method for use with a system having a non-transitory memory and a hardware processor, the method comprising:
providing, using the hardware processor, access to a user to curate a plurality of video clips stored in a content repository, wherein each video clip of the plurality of video clips is associated with one of a plurality of ownership identifications;
receiving, using the hardware processor, curation inputs from the user arranging at least a part of each of two or more video clips of the plurality of video clips into a video clips compilation, wherein the video clips compilation includes a part of a first video clip of the two or more video clips and a part of a second video clip of the two or more video clips, and wherein the first video clip is associated with a first content owner identified by a first ownership identification of the plurality of ownership identifications and the second video clip of the video clips compilation is associated with a second content owner identified by a second ownership identification of the plurality of ownership identifications;
partially and continuously streaming the video clips compilation to a user device, wherein the partially and continuously streaming results in providing all of the part of the first video clip and a portion less than all of the part of the second video clip to the user device in a continuous stream; and
in response to partially and continuously streaming the video clips compilation to the user device, calculating a first fee to be distributed to the first content owner based on streaming all of the part of the first video clip to the user device as a first part of the continuous stream, and a second fee to be distributed to the second content owner based on and in proportion of the portion less than all of the part of the second video clip to all of the part of the second video clip, wherein the portion less than all of the part of the second video clip is streamed to the user device as a second part of the continuous stream.

12. The method of claim 11, wherein the content repository is one of a content owner server or a third party server.

13. The method of claim 11, wherein the plurality of ownership identifications include at least one of an ownership identification (ID) metadata, a watermark, or an audio watermark.

14. The method of claim 11, wherein the first fee includes a licensing fee based on partially streaming the video clips compilation.

15. The method of claim 11, further comprising:
creating, using the hardware processor, a playback log including a number of times all of the part of the first video clip is streamed to the user device and a number of times the portion less than all of the part of the second video clip is streamed to the user device; and storing the playback log in the non-transitory memory.

16. The method of claim 15, further comprising paying the first fee to the first content owner and the second fee to the second content owner is based on the playback log.

17. The method of claim 11, wherein the video clips compilation includes a plurality of URLs, wherein each URL of the plurality of URLs includes a location of a corresponding video clip in the video clips compilation.

18. The method of claim 11, wherein the video clips compilation includes at least one music clip having a music clip owner, and the method further comprises:
calculating, using the hardware processor, a third fee configured to be distributed to the music clip owner based on partially streaming the video clips compilation.

19. The method of claim 11, wherein one of the first video clip or the second video clip includes an audio component associated with a third ownership identification of a third content owner, and the method further comprises:
calculating a third fee to be distributed to the third content owner based on streaming all or part of the audio component.

20. The method of claim 11, further comprising:
calculating a creation fee configured to be distributed to a creator of the video clips compilation as a share of an advertising revenue, based on the partially streaming of the video clips compilation, wherein the first fee is calculated from a portion of the advertising revenue.

21. A method for use with a system having a non-transitory memory and a hardware processor, the method comprising:
providing, using the hardware processor, access to a user to curate a plurality of video clips stored in a content repository, wherein each video clip of the plurality of video clips is associated with one of a plurality of ownership identifications;
receiving, using the hardware processor, curation inputs from the user arranging a first video clip of the plurality of video clips and a second video clip of the plurality of video clips into a video clips compilation, wherein the first video clip is associated with a first content owner identified by a first ownership identification of the plurality of ownership identifications and the second video clip of the video clips compilation is associated with a second content owner identified by a second ownership identification of the plurality of ownership identifications;
partially and continuously streaming the video clips compilation to a user device, wherein the partially and continuously streaming results in providing all of the first video clip and a portion less than all of the second video clip to the user device in a continuous stream; and
in response to partially and continuously streaming the video clips compilation to the user device, calculating a first fee to be distributed to the first content owner based on streaming all of the first video clip to the user device as a first part of the continuous stream, and a second fee to be distributed to the second content owner based on and in proportion of the portion less than all of the part of the second video clip to all of the part of the second video clip, wherein the portion less than all of the part of the second video clip is streamed to the user device as a second part of the continuous stream.

22. The method of claim 21, wherein partially streaming the video clips compilation comprises streaming the portion less than all of the second video clip to the user device immediately after streaming all of the first video clip to the user device.

23. The method of claim 21, wherein the content compilation further comprises a third video clip associated with a third content owner identified by a third ownership identification of the plurality of ownership identifications, wherein partially streaming the video clips compilation comprises streaming none of the third video clip, and wherein no fee is paid to the third content owner.

* * * * *